United States Patent
N G et al.

(10) Patent No.: US 12,182,994 B2
(45) Date of Patent: Dec. 31, 2024

(54) METHOD AND SYSTEM FOR GENERATING A MEDICAL IMAGE WITH LOCALIZED ARTIFACTS USING MACHINE LEARNING

(71) Applicants: Kavitha N G, Bangalore (IN); Punith B V, Hassan (IN)

(72) Inventors: Kavitha N G, Bangalore (IN); Punith B V, Hassan (IN)

(73) Assignee: Siemens Healthineers AG, Forchheim (DE)

( * ) Notice: Subject to any disclaimer, the term of this patent is extended or adjusted under 35 U.S.C. 154(b) by 650 days.

(21) Appl. No.: 17/348,978

(22) Filed: Jun. 16, 2021

(65) Prior Publication Data

US 2022/0005190 A1 Jan. 6, 2022

(30) Foreign Application Priority Data

Jul. 2, 2020 (EP) .................................... 20183672

(51) Int. Cl.
*G06T 5/50* (2006.01)
*G06T 5/20* (2006.01)
(Continued)

(52) U.S. Cl.
CPC .............. *G06T 7/0012* (2013.01); *G06T 5/20* (2013.01); *G06T 2207/20081* (2013.01);
(Continued)

(58) Field of Classification Search
USPC ................ 382/100–159, 168–224, 254–305; 128/897–899, 920–925; 600/30;
(Continued)

(56) References Cited

U.S. PATENT DOCUMENTS 10,853,449 B1 * 12/2020 Nguyen ................. G16H 15/00
11,564,590 B2 * 1/2023 Schlemper ............ G06T 11/008
(Continued)

FOREIGN PATENT DOCUMENTS

EP 3477583 A1 5/2019

OTHER PUBLICATIONS

Saalbach Axel; Motion Artifact Prediction During Data Acquisition; 2019 (Year: 2019).*

(Continued)

*Primary Examiner* — Marcellus J Augustin
(74) *Attorney, Agent, or Firm* — Lempia Summerfield Katz LLC

(57) ABSTRACT

A method, device, and system for generating medical image with localized artifacts are provided. In one aspect, the method includes receiving, by a processing unit, a medical image generated by an imaging modality, identifying presence of one or more artifacts in the medical image using one or more trained machine learning models. Herein, identifying presence of artifacts in medical image includes identifying artifacts in medical image using the trained machine learning models and determining class associated with identified artifacts in medical image using predefined classification index. The method further includes determining at least one artifact of interest from the artifacts based on a predefined criteria, localizing the at least one artifact of interest in the medical image using a post processing technique, and outputting the medical image including localized artifact of interest on a graphical user interface.

17 Claims, 8 Drawing Sheets

(51) Int. Cl.
*G06T 7/00* (2017.01)
*G06T 7/11* (2017.01)

(52) U.S. Cl.
CPC ............ *G06T 2207/20084* (2013.01); *G06T 2207/20182* (2013.01); *G06T 2207/30004* (2013.01)

(58) Field of Classification Search
USPC ...................................... 706/1–62, 900–903
See application file for complete search history.

(56) References Cited

U.S. PATENT DOCUMENTS

| | | | | |
|---|---|---|---|---|
| 11,789,104 B2* | 10/2023 | Lazarus | ............... | G01R 33/565 382/275 |
| 11,842,427 B2* | 12/2023 | Pawar | ............... | G01R 33/56509 |
| 2019/0370965 A1 | 12/2019 | Lay et al. | | |
| 2020/0089980 A1* | 3/2020 | Burge | ............... | G06V 40/50 |
| 2020/0126190 A1* | 4/2020 | Lebel | ............... | G06T 5/60 |
| 2020/0352518 A1* | 11/2020 | Lyman | ............... | A61B 6/5258 |
| 2021/0035338 A1* | 2/2021 | Zhou | ............... | G06N 3/045 |
| 2021/0133962 A1* | 5/2021 | Xin | ............... | A61B 6/5247 |
| 2021/0181287 A1 | 6/2021 | Sommer et al. | | |
| 2022/0130084 A1* | 4/2022 | Litwiller | ............... | G06T 5/60 |

OTHER PUBLICATIONS

Brosch T; Magnetic Resonance Imaging Data Processing System For Processing Motion Artifacts In Magnetic Resonance Imaging Data Sets, Has Processor That Applies Received Magnetic Resonance Imaging Data Set As Input To Trained Deep Learning Network; 2019 (Year: 2019).*

Zhang, Zhenwei, and Ervin Sejdić. "Radiological images and machine learning: trends, perspectives, and prospects." Computers in biology and medicine 108 (2019): 354-370.

* cited by examiner

METHOD AND SYSTEM FOR GENERATING A MEDICAL IMAGE WITH LOCALIZED ARTIFACTS USING MACHINE LEARNING

The present patent document claims the benefit of European Patent Application No. 20183672.3, filed Jul. 2, 2020, which is hereby incorporated by reference in its entirety.

FIELD OF TECHNOLOGY

The present disclosure generally relates to image processing systems, and more specifically to a method and a system for generating a medical image with localized artifacts.

BACKGROUND

In medical imaging analysis, an expert physician or radiologist may examine one or more medical images captured using imaging modalities such as magnetic resonance imaging, computerized tomography, ultrasound, or mammography and analyze the medical images to detect potential abnormalities. Such abnormalities may include lesions, calcifications, micro-calcifications, tumors, and so forth. The radiologists may manually examine the medical images to detect potential abnormalities.

However, such medical images are available with various artifacts that may be caused due to patient movement, scanner coils, metallic implants, hardware issues, power surges, or any other factors that may lead to artifacts in the medical images. Notably, the presence of such artifacts in the medical images may pose a challenge for the radiologists to differentiate between actual abnormalities and artifacts in the medical images. Failure to accurately differentiate between actual abnormalities and artifacts in the medical images may lead to an inaccurate diagnosis of the medical images which may lead to improper treatment of the patient.

In light of the above, there is a need for a system that generates medical images including localized artifacts.

Therefore, the object of the disclosure is to provide a system for generating a medical image including localized artifacts using machine learning models.

SUMMARY

The object of the present disclosure is achieved by a method of generating a medical image with localized artifacts using one or more machine leaning models.

The method includes receiving a medical image generated by an imaging modality. The method further includes identifying presence of one or more artifacts in the medical image using one or more trained machine learning models. The term "artifacts" as used herein refers to one or more features and/or portions in the medical images. The method further includes determining at least one artifact of interest from the one or more artifacts based on a predefined criteria. The term "artifacts of interest" as used herein refers to the at least one artifact in a medical image including more than one classified artifacts that are relevant for a particular diagnosis. The method further includes localizing the at least one artifact of interest in the medical image using a post processing technique. The method further includes outputting the medical image including the localized artifact of interest on a graphical user interface.

The method of identifying presence of one or more artifacts in the medical images may include identifying the one or more artifacts in the medical image using the one or more trained machine learning models. Herein, each of the one or more artifacts correspond to predefined class of artifacts. The method may include determining the class associated with the one or more identified artifacts in the medical image using a predefined classification index.

The method of identifying the one or more artifacts in the medical image using the one or more machine learning models may include inputting feature data to an input node of the trained machine learning model. The method may include identifying at least one artifact belonging to a specific class of artifacts based on the feature data by the trained machine learning model. The method may include outputting a class label indicating the at least one artifact belonging to the class of artifact in the medical image at an output node of the trained machine learning model.

The method of identifying the one or more artifacts in the medical image using the one or more machine learning models may include inputting feature data to an input node of the respective trained machine learning models. Herein, each of the trained machine learning models is configured to detect an artifact in the medical image belonging to a specific class of artifacts. Further, the method may include identifying at least one artifact belonging to the specific class of artifacts in the medical image based on the feature data by each of the respective trained machine learning models. The method may include outputting a class label indicating the presence of the at least one artifact belonging to the specific class of artifacts in the medical image at an output node of each trained machine learning model.

The method of determining the class associated with the one or more identified artifacts in the medical image using the predefined classification index includes determining a class associated with each artifact based on the class label outputted by the one or more trained machine learning models. In an embodiment, the predefined classification index is a mapping between a position and a value of the class labels of the artifacts and the class of the artifacts. In another embodiment, the predefined classification index is a mapping between the class of artifacts and a machine learning model identifier.

The method of determining the at least one artifact of interest from the one or more artifacts includes determining the at least one artifact of interest in the medical image from the one or more artifacts using an artificial intelligence algorithm.

The method of determining the at least one artifact of interest from the one or more artifacts includes determining the at least one artifact of interest in the medical image from the one or more artifacts using a predefined set of rules.

The method of localizing the at least one artifact of interest in the medical image using the post processing technique includes determining data corresponding to the specific class of the at least one artifact of interest by back propagating the one or more trained machine learning models. The method includes computing discriminative regions indicative of a location of the at least one artifact of interest in the medical image based on the determined data corresponding to the specific class of the at least one artifact of interest. The method includes reconstructing an image including the discriminative regions indicative of a location of the at least one artifact of interest. The method includes localizing the at least one artifact of interest in the medical image based on the reconstructed image.

Alternatively, the method of localizing the at least one artifact of interest in the medical image using the post processing technique includes comparing the received medical image with a plurality of pre-segmented medical images. Further, the method includes determining a region of interest in the medical image based on the comparison between the received medical image with the plurality of pre-segmented medical images. The method includes localizing the at least one artifact of interest in the medical image based on the determined region of interest.

The object of the present disclosure is also achieved by a device for generating a medical image with localized artifacts. The device includes a processing unit a memory unit communicatively coupled to the processing unit. Herein, the memory unit includes an artifact recognition module configured to perform the method as aforementioned.

The object of the present disclosure is also achieved by a system including at least one imaging modality for acquiring a medical image of a patient. The system includes a device communicatively coupled to the at least one imaging modality.

The object of the present disclosure is also achieved by a computer program product including machine readable instructions, that when executed by a processing unit, cause the processing unit to perform a method as aforementioned.

This summary is provided to introduce a selection of concepts in a simplified form that are further described below in the following description. It is not intended to identify features or essential features of the claimed subject matter. Furthermore, the claimed subject matter is not limited to implementations that solve any or all disadvantages noted in any part of this disclosure.

BRIEF DESCRIPTION OF DRAWINGS

The present disclosure is further described hereinafter with reference to illustrated embodiments shown in the accompanying drawings.

Figure 1:
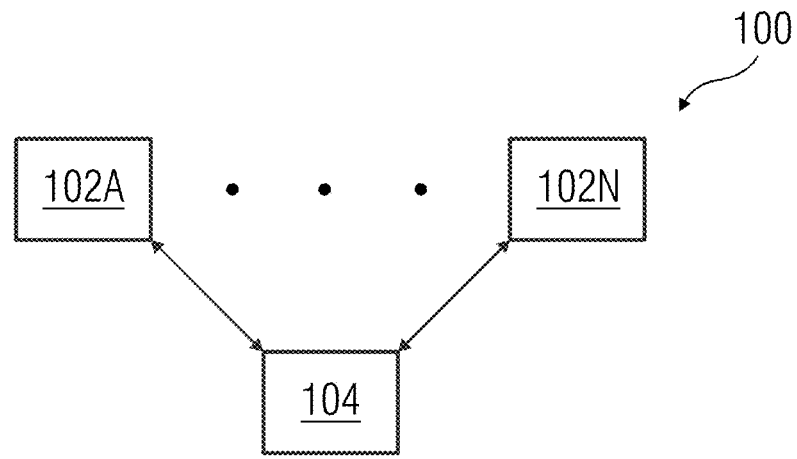
FIG. 1 is a block diagram of a system for generating localized medical images, according to an embodiment.

Hereinafter, embodiments for carrying out the present disclosure are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

DETAILED DESCRIPTION

FIG. 1 is a block diagram of a system 100 for generating medical images with localized artifacts, according to an embodiment. As shown, the system 100 includes imaging modalities 102A-N communicatively coupled to a device 104. Notably, the each of the imaging modalities 102A-N may be coupled to dedicated devices 104, or to a single device 104. The imaging modalities 102A-N may be connected to the device 104 in multiple ways. Two such embodiments have been described later in in FIG. 3 and FIG. 4.

The term "imaging modality" 102A-N as used herein refers to a combination of one or more electronic components using a medical imaging technique and in particular refers to a system which is applies an energy to an anatomical structure in order to generate (medical) image data, in particular, a medical image. Examples of imaging modalities 102A-N include (but are not limited to) x-ray, computed x-ray tomography (also called computed tomography and abbreviated as CT), magnetic resonance tomography (abbreviated as MR or MRT), ultrasound imaging, CT, magnetic resonance imaging (MRI), functional MRI (e.g., fMRI, DCE-MRI, and diffusion MRI), cone beam computed tomography (CBCT), Spiral CT, positron emission tomography (PET), single photon emission computed tomography (SPECT), X-ray, optical tomography, fluorescence imaging, ultrasound imaging, radiotherapy portal imaging, and so forth.

Furthermore, the term "artifacts" as used herein refers to one or more features and/or portions in the medical images that are not a part of objects of interest in the medical images. Notably, artifacts may be considered as distortions or abnormalities in the medical images that may be present as additional features in the medical images, generally not desired by a physician analyzing the medical image. In an embodiment, artifacts may be defined as one or more features in the medical images that may appear in the medical images due to external reasons such as induced artifacts from imaging modality, patient movement, distortion caused due to scanner coil, metallic implants and so forth. Such external factors may lead to introduction of certain artifacts in the medical images that are undesirable by a person analyzing the medical images.

In an embodiment, the one or more artifacts induced by external factors includes at least of: a zebra strike artifact, a phase encoding artifact, a distorted artifact, a pulsation artifact, a susceptibility artifact, and a zipper artifact. In another embodiment, artifacts may be defined as one or more integral features of the medical images as acquired from an anatomical region in a body of the patient. Such integral features may be one or more lesions in the medical image indicative of an abnormality or a disease in the body of the patient. Such integral features may be lesions, fractures, tears, abrasions, cuts, swellings, lacerations, bruises, sores, contusions and so forth that appear in the medical images but may not be useful to the physician for a given diagnosis. For example, some particular lesions in the medical image, such as a tumor may be pre-known to the physician, therefore tumor serves as an additional feature and may be termed as an artifact in the medical image.

Figure 2:
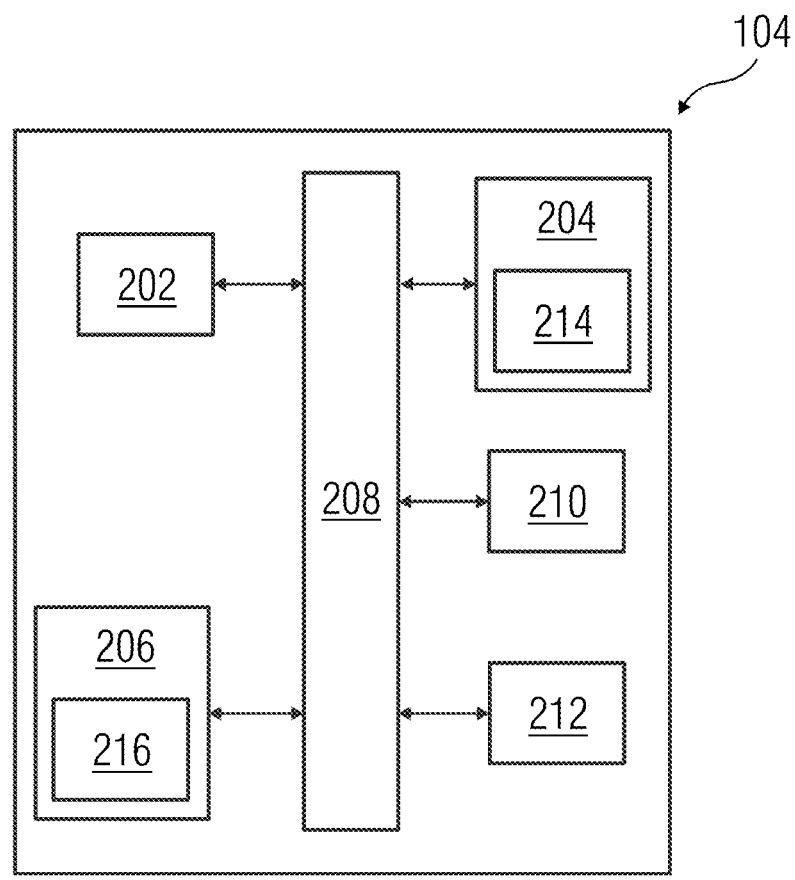
FIG. 2 is a block diagram of a device of FIG. 1 for generating medical images with localized artifacts, according to an embodiment.

FIG. 2 is a block diagram of a device 104 for generating a medical image including localized artifacts using one or more trained machine learning models, according to an embodiment. The device 104 may be a personal computer, a laptop computer, a tablet, and the like. The device 104 includes a processing unit 202, a memory 204, a storage unit 206, a bus 208, an input unit 210, and a display unit 212. The device 104 is a specific purpose computer configured to generate a medical image with localized artifacts using one or more trained machined learning models.

The processing unit 202, as used herein, means any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 102 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the processing unit 202, such as being a computer-readable storage medium. The processing unit 202 may execute instructions and/or code stored in the memory 204. A variety of computer-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

In the present embodiment, the memory 204 includes an artifact recognition module 214 stored in the form of machine-readable instructions on any of the above-mentioned storage media and may be in communication to and executed by the processing unit 202. When the machine-readable instructions are executed by the processing unit 202, the artifact recognition module 214 causes the processing unit 202 to receive a medical image generated by an imaging modality, identify presence of one or more artifacts in the medical image using one or more trained machine learning models, determine at least one artifact of interest from the one or more artifacts based on a predefined criteria, localize the at least one artifact of interest in the medical image using a post processing technique, and output the medical image including the localized at least one artifact of interest on a graphical user interface.

The storage unit 206 may be a non-transitory storage medium which stores a machine learning model database 216. The machine learning model database 216 is configured to store trained machine learning models for generating localized medical images received from the imaging modality. Exemplary machine learning models may include neural network models, deep neural network models, random forest models, XGBoost models, and so on. The input unit 110 may include input devices such as keypad, touch-sensitive display, camera (such as a camera receiving gesture-based inputs), etc. capable of receiving input signals such as selection for artifacts of interest for localization thereof. The display unit 212 may be a device with a graphical user interface displaying localized artifacts in the medical images. The graphical user interface may also enable users to select artifacts from interest from one or more identified and classified artifacts in the medical images for performing localization of the artifacts of interest. The bus 208 acts as interconnect between the processing unit 202, the memory 204, the storage unit 206, the input unit 210, and the display unit 212.

Those of ordinary skilled in the art will appreciate that the hardware depicted in FIG. 1 may vary for particular implementations. For example, other peripheral devices such as an optical disk drive and the like, a Local Area Network (LAN)/Wide Area Network (WAN)/Wireless (e.g., Wi-Fi) adapter, a graphics adapter, a disk controller, or an input/output (I/O) adapter also may be used in addition to or in place of the hardware depicted. The depicted example is provided for the purpose of explanation only and is not meant to imply architectural limitations with respect to the present disclosure.

The device 104 in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Washington may be employed if suitably modified. The operating system is modified or created in accordance with the present disclosure as described.

Figure 3:
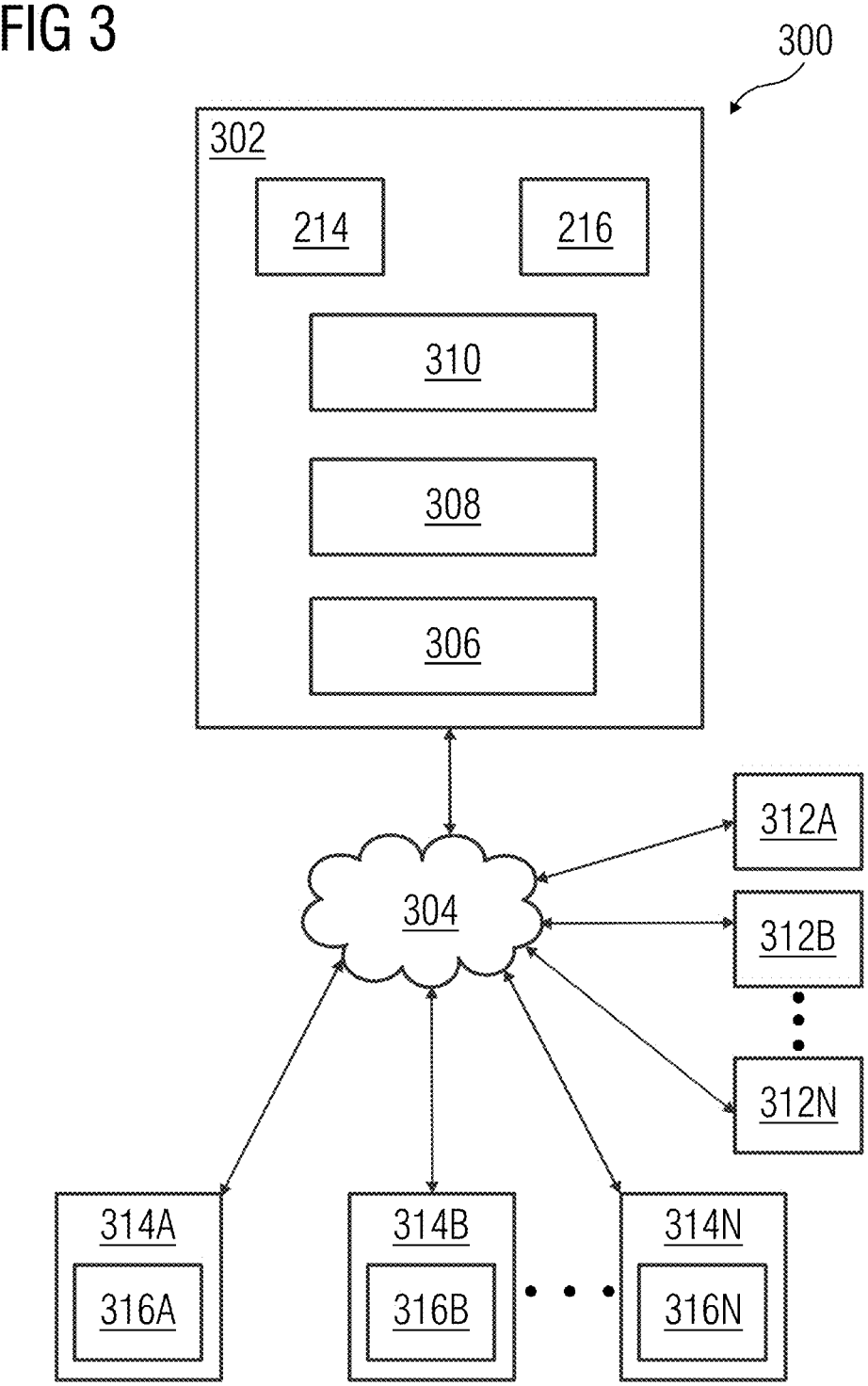
FIG. 3 is a block diagram of a system for generating medical images with localized artifacts, according to another embodiment.

FIG. 3 is a schematic representation of a system 300 for generating medical images including localized artifacts using one or more trained machine learning models, according to another embodiment. Particularly, the system 300 includes a cloud computing system 302 configured for providing cloud services for generating medical images including localized artifacts.

The cloud computing system 302 includes a cloud communication interface 306, cloud computing hardware and OS 308, a cloud computing platform 310, the artifact recognition module 214, and the machine learning model database 216. The cloud communication interface 306 enables communication between the cloud computing platform 310, and imaging modalities 312A-N, and user devices 314A-N associated with respective imaging modalities 312A-N via a network 304.

The cloud computing hardware and OS 308 may include one or more servers on which an operating system (OS) is installed and includes one or more processing units, one or more storage devices for storing data, and other peripherals required for providing cloud computing functionality. The cloud computing platform 310 is a platform which implements functionalities such as data storage, data analysis, data visualization, or data communication on the cloud hardware and OS 308 via APIs and algorithms. The cloud computing platform 310 delivers the aforementioned cloud services using cloud-based applications (e.g., computer-aided design application). The cloud computing platform 310 employs the artifact recognition module 214 for generating a medical image including localized artifacts using one or more trained machine learning models. The cloud computing platform 310 also includes the machine learning model database 216 for storing trained machine learning models for determine candidates in a geometric model for performing a geometric operation. Exemplary machine learning models may include convolutional neural network (CNN) models, deep neural network models, random forest models, XGBoost models, and so on. The cloud computing platform 310 may include a combination of dedicated hardware and software built on top of the cloud hardware and OS 308.

In accordance with the foregoing embodiments, the cloud computing system 302 may enable users to generate medical images with specific localized artifacts using trained machine learning models stored in the machine learning model database 216. In particular, the artifact recognition module 214 may classify the artifacts in the medical images to predetermined class such as a zebra strike artifact, a phase encoding artifact, a distorted artifact, a pulsation artifact, a susceptibility artifact, and a zipper artifact using the one or more trained machine learning models. Advantageously, the cloud computing system 302 may enable physicians to remotely generate medical images having localized artifacts using trained machine learning models by automatically identifying artifacts of interest.

The user devices 314A-N include graphical user interfaces 316A-N for receiving a selection of artifacts of interest and displaying medical images having localized artifacts of interest. Each of the user devices 314A-N may be provided with a communication interface for interfacing with the cloud computing system 302. Users or physicians of the user devices 314A-N and corresponding imaging modalities 312A-N may access the cloud computing system 302 via the graphical user interfaces 316A-N. For example, the users may send request to the cloud computing system 302 to perform a localization operation on a medical image using trained machine learning models. The graphical user interfaces 316A-N may be specifically designed for accessing the artifact recognition module 114 in the cloud computing system 302.

Figure 4:
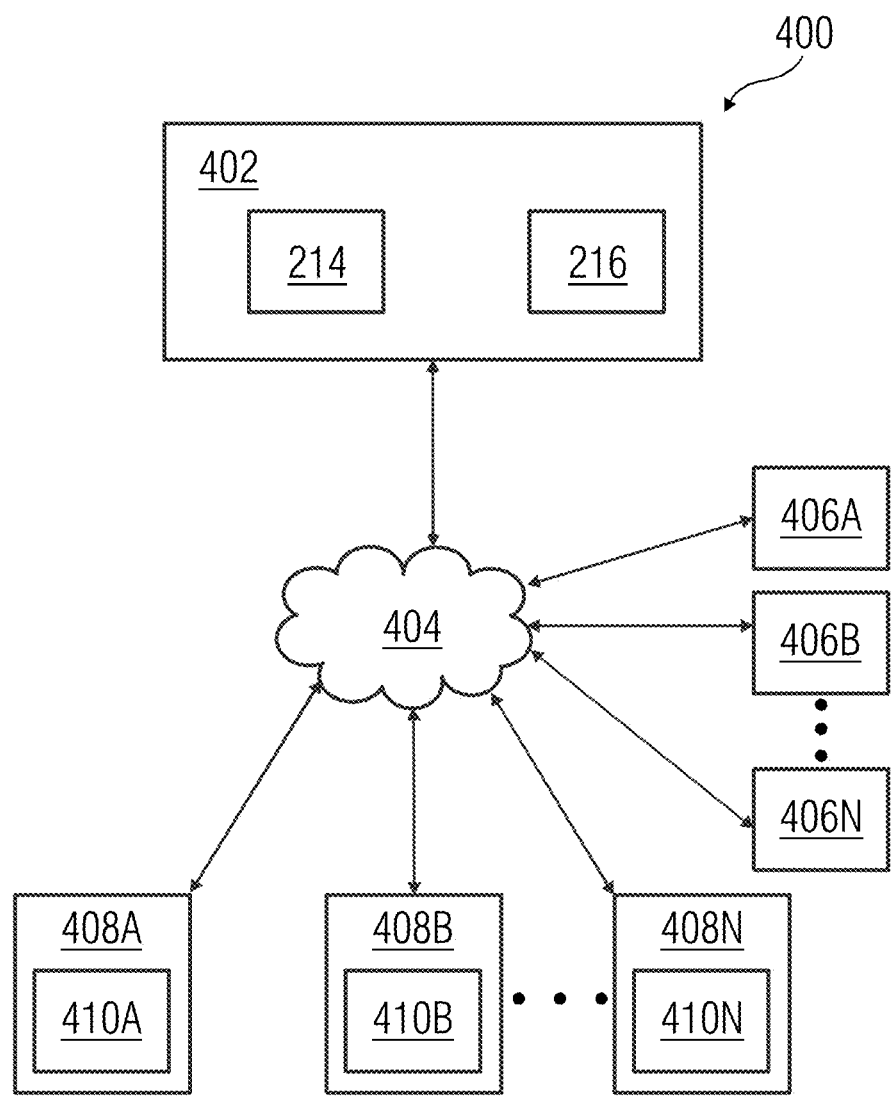
FIG. 4 is a block diagram of a system for generating medical images with localized artifacts, according to another embodiment.

FIG. 4 is a block diagram of a system 400 for generating medical images having localized artifacts using machine learning models, according to yet another embodiment. Particularly, the system 400 includes a server 402, a plurality of imaging modalities 406A-N, and a plurality of user devices 408A-N. Each of the imaging modalities 406A-N and user devices 408A-N is connected to the server 402 via a network 404 (e.g., Local Area Network (LAN), Wide Area Network (WAN), Wi-Fi, etc.). The system 400 is another implementation of the system 200 of FIG. 1, wherein the artifact recognition module 214 resides in the server 402 and is accessed by user devices 408A-N via the network 404.

The server 402 includes the artifact recognition module 214 and the machine learning model database 216. The server 402 may also include a processor, a memory, and a storage unit. The artifact recognition module 214 may be stored on the memory in the form of machine-readable instructions and executable by the processor. The machine learning model database 216 may be stored in the storage unit. The server 402 may also include a communication interface for enabling communication with imaging modalities 406A-N and user devices 408A-N via the network 404.

When the machine-readable instructions are executed, the artifact recognition module 214 causes the server 402 to classify and localize artifacts in medical images using trained machine learning model.

The user devices 408A-N include graphical user interfaces 410A-N for receiving a selection of artifacts of interest and displaying localized artifacts in the medical images. Each of the user devices 408A-N may be provided with a communication interface for interfacing with the server 402. Users of the user devices 408A-N may access the server 402 via the graphical user interfaces 410A-N. For example, the users may send request to the server 402 to perform a localization operation in medical images using trained machine learning models. The graphical user interfaces 410A-N may be specifically designed for accessing the artifact recognition module 214 in the server 402.

Figure 5:
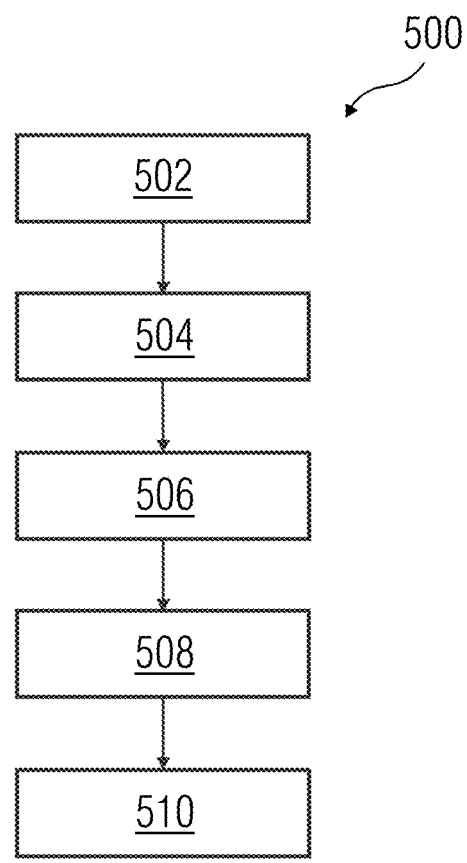
FIG. 5 is a flowchart of a method for generating medical images with localized artifacts according to an embodiment.

FIG. 5 is a flowchart of a method 500 of generating medical images with localized artifacts, according to one embodiment. At act 502, a medical image generated by the imaging modality 102A-N is received by the processing unit 202. In particular, the imaging modality 102A-N is an MR device. Furthermore, the term "medical image" as used herein refers to an image representing an object, such as an anatomical region of a person or animal that is useful for medical purposes. Herein, the term "medical image" is used to refer to a medical image including artifacts. Notably, the medical image is obtained from any of the aforementioned imaging modalities 102A-N. In an embodiment, the medical images may be received from a database.

At act 504, presence of one or more artifacts is identified in the medical image using one or more trained machine learning models. The trained machine learning model is capable of determining whether a given image includes artifacts or not. The identification of the one or more artifacts in the medical image is based on several parameters in the medical image such as shape of the artifacts, size of the artifacts, boundary and edges of the artifacts, intensity values of the artifacts and so forth. In particular, the trained machine learning model is capable of determining whether a given medical image is a normal medical image or an artifact medical image, thereby identifying an absence or a presence of an artifact in the medical image respectively. Herein, each of the one or more artifacts correspond to predefined class of artifacts. In particular, predefined class of artifacts may be a zebra strike artifact, a phase encoding artifact, a distorted artifact, a pulsation artifact, a susceptibility artifact, and a zipper artifact. It will be appreciated that a given medical image may include single artifacts or multiple artifacts.

Notably, the term "machine learning models" refers to any algorithm that may learn a model or a pattern based on existing information or knowledge and predict or estimate output using input of new information or knowledge. Herein, the machine learning model infers a prediction model given a set of training data. Each individual sample of the training data may be a pair containing a dataset (e.g., one or more images or imaging data) and a desired output value or dataset. The machine learning model analyzes the training data and produces a predictor function. The predictor function, once derived through training, is capable of reasonably predicting or estimating the correct output value or dataset. Furthermore, the one or more machine learning models are trained using a large number of training dataset of medical images. The training dataset may include number of medical images without artifacts and a number of medical images with different artifacts along with their defined classes. For the sake of simplicity and clarity, the medical images without artifacts are sometimes referred to as "normal medical images" and the medical images with artifacts are sometimes referred to as "artifacts medical images".

In one or more embodiments, the medical images with specific artifacts such as lesions, tumors, fractures, or cuts are also referred to as normal images. In such a case, only artifacts induced due to external factors will be considered as artifacts. The training dataset is fed into the machine learning model and is trained to detect and classify a given image into a predefined class based on one or more features present in the medical images of the training dataset. In an example, a machine learning model is trained to classify the medical images into 7 predefined classes such as a normal image, a zebra strike artifact, a phase encoding artifact, a distorted artifact, a pulsation artifact, a susceptibility artifact, and a zipper artifact. Notably, the medical image as received from the imaging modality is inputted to an input node of the trained machine learning model. Exemplary trained machine learning models may include convolutional neural network (CNN), deep neural network, random forest, XGBoots, and the like.

In an example, the disclosure is based on a convolutional neural network (CNN) for classification of artifacts in the medical image. The CNN includes one or more convolutional layers, ReLU layers, pooling layers, and a fully connected layer. CNNs have an input layer, and output layer, and hidden layers. The hidden layers may include convolutional layers, ReLU layers, pooling layers, and fully connected layers. In particular, the convolutional layers apply a convolution operation to the received medical image and passes the information as clusters of neurons on to next layer of the CNN. The pooling layers combine the outputs of clusters of neurons into a single neuron in the next layer of the CNN. Further, the fully connected layers connect every neuron in one layer to every neuron in the next layer, to create an entire CNN network.

According to an embodiment, the one or more artifacts in the medical image are identified using the one or more machine learning models. Herein, each of the one or more artifacts correspond to predefined class of artifacts. Notably, the medical images are classified into predefined classes using the trained machine learning models. The medical image classification is the task of taking an input medical image and outputting a class or one or more features (e.g., a zebra artifact, a phase encoding artifact, etc.) or a probability of classes (features) that best describes the medical image. This is achieved using learning feature hierarchies, with features from higher levels of a hierarchy formed by composition of lower lever features. For example, a feature may be a certain visible artifact or a certain visible characteristic of an artifact. Examples of low-level features are a color, a texture, an edge, and a curve. Examples of high-level features are an increased size of a lesion or tumor, a susceptibility artifact, a phase encoding artifact, and so forth. In an example of hierarchical features, a zipper artifact may be identified by a composition of single line like feature having a substantial length and a substantial thickness. In turn, the single line may be identified by a composition of multiple high intensity pixel values arranged in a colinear fashion. It will be appreciated that the machine learning model is capable of automatically learning features at multiple levels of abstraction allows a system to learn complex functions mapping an input medical image to an output classification directly from a received medical image.

In an example, the trained machine learning model is capable of identifying the class of artifacts from the predefined classes such as a zebra strike artifact, a phase encoding artifact, a distorted artifact, a pulsation artifact, a susceptibility artifact, and a zipper artifact. The identification of the one or more artifacts in the medical image is based on several parameters in the medical image such as shape of the artifacts, size of the artifacts, boundary and edges of the artifacts, intensity values of the artifacts, and so forth. In an example, a zebra artifact is identified in the medical image by identifying distinguished features on a portion of a given medical mage including alternatively occurring high intensity and low intensity pixel values arranged in an array. In another example, a zipper artifact is identified based on distinguished features such as an array of high intensity pixel values on a portion in a given medical image.

In accordance with the foregoing embodiments, the trained machine learning models are generated by training machine learning models based on a training data set. The training data set includes object feature data such as anatomical feature data, artifact specific data, and behavioral features data such as heuristic data, domain data, best practice data, and context data. For example, the feature data may include the type of anatomical feature, artifact feature data (e.g., line, circular, semi-circular for edges), distance between two artifacts, volume, material, information about neighboring objects (e.g., attributes boundaries and edges of artifacts), and the like. The behavioral feature data may include a classification history or predefined classes, a difference between index of current state of medical image and an operation which may have induced the artifact in the medical image, and the like.

In one embodiment, a single trained machine learning model is capable of identifying the class of one or more artifacts in the medical image. Such an identification of artifacts is described in detail in conjunction with FIGS. 6A-B. In another embodiment, more than one artificial intelligence models are capable of identifying the class of one or more artifacts in the medical image. Such an identification of artifacts is described in detail in conjunction with FIGS. 7A-B.

At act 506, at least one artifact of interest is determined from the one or more artifacts based on a predefined criteria. Notably, a given medical image may include more than one artifact which may or may not be of interest to the physician for medical diagnosis. Therefore, the present disclosure efficiently determines one or more artifacts of interest from the one or more identified artifacts. The term "artifacts of interest" as used herein refers to the at least one artifact in the classified medical image including more than one artifact that are relevant for a particular diagnosis. The determination and further localization of the at least one artifact of interest enhances an efficiency of the algorithm and makes the method time efficient.

According to an embodiment, the at least one artifact of interest is identified from the one or more artifacts by determining the at least one artifact of interest in the medical image from the one or more artifacts using an artificial intelligence algorithm. The artificial intelligence algorithm is trained to automatically determine the at least one artifact of interest for a given medical image based on a number of parameters. In an example, the artificial intelligence algorithm determines artifacts of interest in a given medical based on a probabilistic model that uses historical data to determine artifacts of interest. In particular, the probabilistic model determines the artifacts that have a highest probability value and are therefore important to be localized, based on the historical data of previously localized medical images. In an example, the artificial intelligence model determines from the historical data that MR images from a particular imaging modality is more susceptible to zipper artifacts, then the artifacts of interest are zipper artifacts.

According to another embodiment, the at least one artifact of interest from the one or more artifacts is determined by the at least one artifact of interest in the medical image from the one or more artifacts using a predefined set of rules. The predefined set of rules define the artifacts of interest from the one or more artifacts present in the medical image based on a number of parameters such as a type of medical images, a format of medical images, a preference of physician, and so forth. In a particular embodiment, the physician may define the set of rules to determine the artifacts of interest prior to acquisition procedure or after the acquisition procedure. For this purpose, the identified artifacts are presented to the physician on a graphical user interface and the physician is prompted to select the artifacts of interest to be localized.

At act 508, the at least one artifact of interest in the medical image is localized using a post processing technique. The localization of the artifacts is performed to determine an exact location of the artifacts in the medical images. Such a post processing technique is described in detail in FIG. 8.

At act 510, the medical image including the localized at least one artifact of interest is outputted on a graphical user interface. In an example, the artifacts of interest are highlighted to distinctively be presented on the graphical user interface. Further, the artifacts of interest labelled with the identified class and presented on the graphical user interface.

Figure 6A:
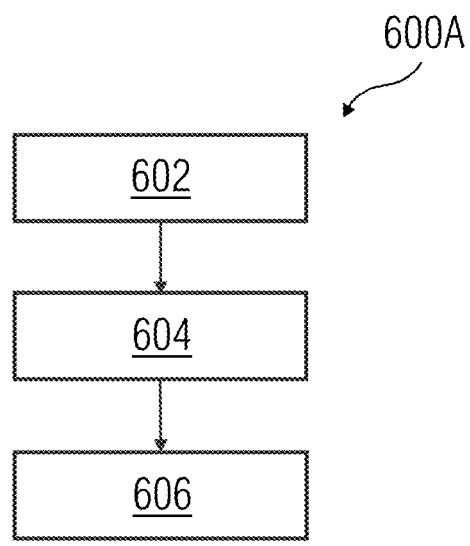
FIG. 6A is a flowchart of a method for identifying the one or more artifacts in the medical image using a single trained machine learning model, according to an embodiment.

FIG. 6A is a flowchart depicting a method 600A for identifying the one or more artifacts in the medical image using a single trained machine learning model, according to an embodiment. At act 602, feature data is inputted to an input node of the trained machine learning model. In an example, feature data is the medical image having a reduced dimensionality for the purpose of classification of the medical image and corresponding to one or more features of an anatomical structure in the medical image. The feature data is labelled and normalized prior to inputting to the input node of the trained machine learning model. At act 604, at least one artifact is identified belonging to a specific class of artifacts based on the feature data by the trained machine learning model. In an example, a specific class of artifacts such as a zebra strike artifact, a phase encoding artifact, a distorted artifact, a pulsation artifact, a susceptibility artifact, and a zipper artifact may be identified from distinguishing feature data pertaining to the specific class. In an example, distinctive feature for zipper artifacts is an array of high intensity pixel values arranged in colinearly. At act 606, a class label indicating the at least one artifact belonging to the class of artifact in the medical image is outputted at an output node of the trained machine learning model. The class label associated may be a binary value such as '0' or '1' which is outputted at the output node of the trained machine learning model. It will be appreciated that the machine learning algorithm is trained to determine a specific class of the artifacts is identified from the predetermined classes, such as normal medical image, a zebra strike artifact, a phase encoding artifact, a distorted artifact, a pulsation artifact, a susceptibility artifact, and a zipper artifact. Further, the identified class for a given medical image is outputted as a class label at the output node of the trained machine learning model. In an example, the class label may be '00010101' outputted at the output node of the trained machine learning model. Herein, the class label '00010101' depicts that three artifacts are present in the given medical image.

Figure 6B:
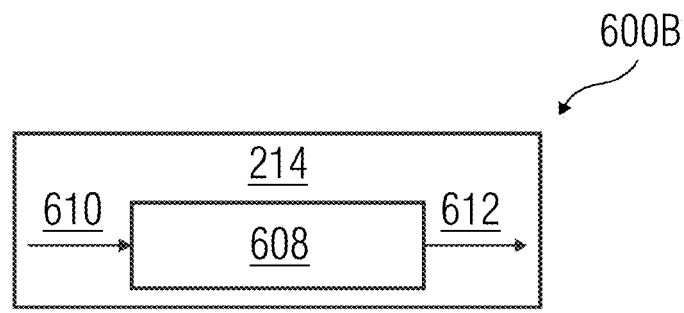
FIG. 6B is a block diagram of an artifact recognition module for classification of artifacts using the trained machine learning model, according to an embodiment.

FIG. 6B is a block diagram 600B, depicting the artifact recognition module 114 with a single trained machine learning model, in accordance with an embodiment of the present disclosure. As shown, the artifact recognition module 114 employs a single trained machine learning model 608 for localizing the artifacts in the trained machine learning model. The trained machine learning model 608 may be a deep neural network model, XGBoost model, random forest model, and the like. The trained machine learning model 608 receives feature data 610 as input. The trained machine learning model 608 analyzes the feature data 610, classifies the feature data 608 of the medical image, and computes a class label 612 associated with each artifact in the feature data 608. The class label 612 indicate a specific class of artifacts to which the one or more artifacts belong.

Figure 7A:
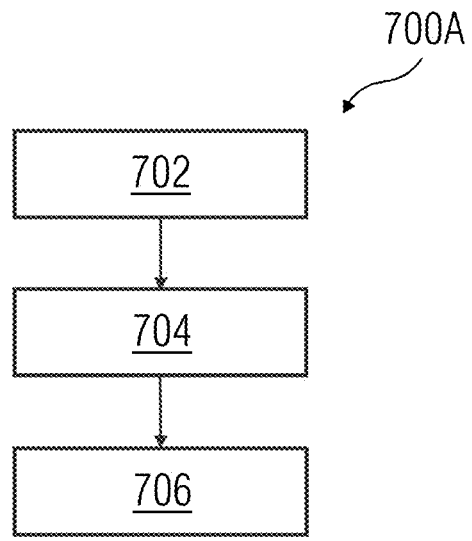
FIG. 7A is a flowchart of a method for identifying the one or more artifacts in the medical image using one or more trained machine learning models, according to another embodiment.

FIG. 7A is a flowchart depicting a method 700A for identifying the one or more artifacts in the medical image using one or more trained machine learning models, according to an embodiment. Herein, each of the trained machine learning models is configured to detect an artifact in the medical image belonging to a specific class of artifacts. It will be appreciated that multiple machine learning models are employed and each of the machine learning model is trained to identify a specific class of artifacts. At act 702, feature data is inputted to an input node of the respective trained machine learning models. Herein, each of the trained machine learning models is configured to detect an artifact in the medical image belonging to a specific class of artifacts. In an example, feature data is the medical image having a reduced dimensionality for the purpose of classification of the medical image and corresponding to one or more features of an anatomical structure in the medical image. The feature data is labelled and normalized prior to inputting to each of the input nodes of the one or more trained machine learning models. In particular, each of the trained machine learning models is input with the same feature data pertaining to the a given medical image and is capable of determining only the specific class of artifacts for which the machine learning algorithm is trained. For example, a first trained machine learning model is configured to determine phase encoding artifacts, and a second trained machine learning model is configured to identity susceptibility artifacts. It will be appreciated that, for this purpose, a number of machine learning models is equal to a number of the predefined classes of artifacts.

At act 704, at least one artifact belonging to the specific class of artifacts is identified in the medical image based on the feature data by each of the respective trained machine learning models. In an example, a specific class of artifacts such as a zebra strike artifact, a phase encoding artifact, a distorted artifact, a pulsation artifact, a susceptibility artifact, and a zipper artifact may be identified from distinguishing feature data pertaining to the specific class. In an example, distinctive feature for zebra strike artifacts is alternate occurrence of high intensity and low intensity array of pixels in a random fashion.

At act 706, a class label indicating the presence of the at least one artifact belonging to the specific class of artifacts in the medical image is outputted at an output node of each trained machine learning model. The class label may be a flag or a numeric value such as '0' or '1' which is outputted at the output node of each of the trained machine learning models. It will be appreciated that each of the machine learning models are trained to identify only one specific class of artifacts for which it is trained for. In a case, when a given medical image includes a specific artifact such as zipper artifacts, then only machine learning model trained to determine zipper artifacts outputs the class label as '1' and the other trained machine learning models output the class label '0'.

Figure 7B:
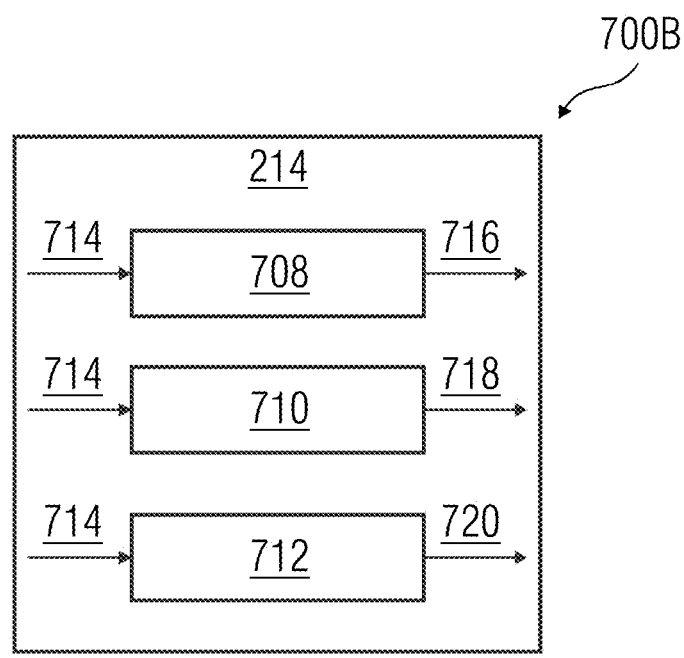
FIG. 7B is a block diagram of an artifact recognition module for classification of artifacts using one or more trained machine leaning models, according to another embodiment.

FIG. 7B is a block diagram 700B, depicting the artifact recognition module 114 with three trained machine learning models, in accordance with an embodiment of the present disclosure. As shown, the artifact recognition module 114 employs a first trained machine learning 708, a second trained machine learning model 710 and a third trained machine learning model 712. Notably, the first trained machine learning 708 is employed for detecting specific class of artifacts such as zebra strike artifacts, the second trained machine learning model 710 is employed for detecting another specific class of artifacts such as phase encoding artifacts, and the third trained machine learning model 712 is employed for detecting another specific class of artifacts such as zipper artifacts. The first trained machine learning model 708, the second trained machine learning model 710, and the third trained machine learning model 712 are inputted with a feature data 714. Each of first trained machine learning model 708, the second trained machine learning model 710, and the third trained machine learning model 712 analyze the feature data 714, classify the feature data 714 of the medical image and computes a first class label 718, a second class label 720, and a third class label 722, respectively. In an exemplary implementation, if a given image includes two artifacts such as a zebra strike artifact and zipper artifact, the output first class label is '1', the output second class label is '0', and the output third class label is '1'.

According to an embodiment, the class associated with the one or more identified artifacts is determined in the medical image using a predefined classification index. The term "predefined classification index" refers to an associative referral index providing a relationship between the identified class of artifacts and the one or more parameters of the trained machine learning models. According to an embodiment, the class associated with the one or more identified artifacts in the medical image is determined using the predefined classification index. In particular, a class associated with each artifact is determined based on the class label outputted by the one or more trained machine learning models.

According to an embodiment, the predefined classification index is a mapping between a position and a value of the class labels of the artifacts and the class of the artifacts. In an example, the class label outputted for a given medical image may be of the order of 7, and outputted as binary values 0, 1, 0, 0, 1, 0, 0, for 7 predefined classes, (e.g., normal image, a zebra strike artifact, a phase encoding artifact, a distorted artifact, a pulsation artifact, a susceptibility artifact, and a zipper artifact). The predefined classification index defines a relationship between a value of the class label and the class of the artifacts in a manner that value '0' is indicative of an absence of an artifact and value '1' is indicative of a presence of an artifact. Further, the predefined classification index defines a relationship between a position of the class label and the class of artifacts in a manner that a first position with bit value '0' indicates that image is not a normal image, a second position with bit value '1' indicates that the medical image includes a zebra strike artifact, a third position with bit value '0' indicates that the medical image does not include a phase encoding artifact, a fourth position with bit value '0' indicates that the medical image does not include a distorted artifact, a fifth position with bit value '1' indicates that the medical image includes a pulsation artifact, a sixth position with bit value '0' indicates that the medical image does not include a susceptibility artifact, and a seventh position with bit value '0' indicated that the medical image does not include a zipper artifact.

According to an embodiment, the predefined classification index is a mapping between the class of artifacts and a machine learning model identifier. In an example, three trained machine learning algorithms are employed for localization of artifacts. Herein, each of the trained machine learning models is employed for determining a specific class of artifacts and is identified by the machine learning model identifier. For example, a first trained machine learning model may have a machine learning model identifier 'A', a second trained machine learning model may have a machine learning model identifier 'B', and a third trained machine learning model may have machine learning model identifier 'C'. In this case, the predefined classification index defines that 'A' is associated with normal images, 'B' is associated with zipper artifacts and 'C' is associated with zebra strike artifacts.

Figure 8:
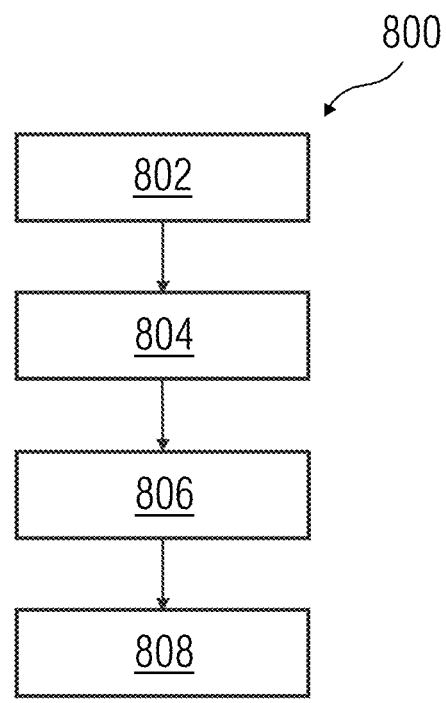
FIG. 8 is a flowchart of a method for localizing at least one artifacts of interest in the medical image, according to an embodiment.

FIG. 8 illustrates a flowchart of a method 800 for localizing the at least one artifact of interest in the medical image using a post processing technique, in accordance with an embodiment. The post processing technique of localization are implemented after the medical images are classified and the artifacts of interest are determined. At act 802, data corresponding to the specific class of the at least one artifact of interest is determined by back propagating the one or more trained machine learning models. In particular, neural network of the trained machine learning model is traced backwards from the output node of the trained machine learning model towards the input node of the trained machine learning model, in a manner to collect data pertaining to the identified class of artifacts from each of the layer of the neural network.

At act 804, discriminative regions indicative of a location of the at least one artifact of interest are computed in the medical image based on the determined data corresponding to the specific class of the at least one artifact of interest. The data determined from each of the layers is distinctive feature of a specific class of artifacts that is identified from each of the layers of the neural network to determine discriminative regions. Notably, the discriminative regions are portions of the medical image that are distinctive features of the artifact of interest to be localized. At act 806, an image including the discriminative regions indicative of a location of the at least one artifact of interest is reconstructed. In an example, the medical image is constructed to highlight the discriminative regions in the medical image indicative of localized the at least one artifact of interest. At act 808, the at least one artifact of interest is localized in the medical image based on the reconstructed image. In an example, the reconstructed image is rescaled and resized to obtain the original given medical image including highlighted localized artifacts of interest.

In an exemplary implementation, a class activation map (CAM) is generated for each of the class of artifacts to localize the artifacts of interest in the medical image. A class activation map for a particular class indicates the discriminative image regions used by the CNN to identify that class. It will be appreciated that in terms of neural networks, each layer in the neural network is to be activated by some visual pattern within its receptive field. Therefore, a map of the presence of this visual pattern is computed. The class activation map is simply a weighted linear sum of the presence of these visual patterns at different spatial locations. By simply up-sampling the class activation map to the size of an input image (here, the medical image), we may identify the image regions most relevant to the particular class (here, class of artifacts). The network largely includes convolutional layers, and just before the final output layer, global average pooling is performed on the convolutional feature maps and use the features for a fully-connected layer that produces the desired output (categorical or otherwise). Further, the importance of the image regions is identified by projecting back the weights of the output layer on to the convolutional feature maps to obtain localized medical images.

In an alternate embodiment, localizing the at least one artifact of interest in the medical image using the post processing technique includes comparing the received medical image with a plurality of pre-segmented medical images. The medical images may be manually segmented by a physician to compute a map for each of the type of artifacts. Further, the method includes determining a region of interest in the medical image based on the comparison between the received medical image with the plurality of pre-segmented medical images. A comparison may be made between the received medical and the pre-segmented medical images by superimposing the received image onto each of the pre-segmented medical images to identify a region of interest in the medical image pertaining to a particular pre-segmented medical image. Further, the method includes localizing the at least one artifact of interest in the medical image based on the determined region of interest. The at least one artifact of interest is localized when the received medical image is completely superimposed on the one or more pre-segmented medical images.

Figure 9:
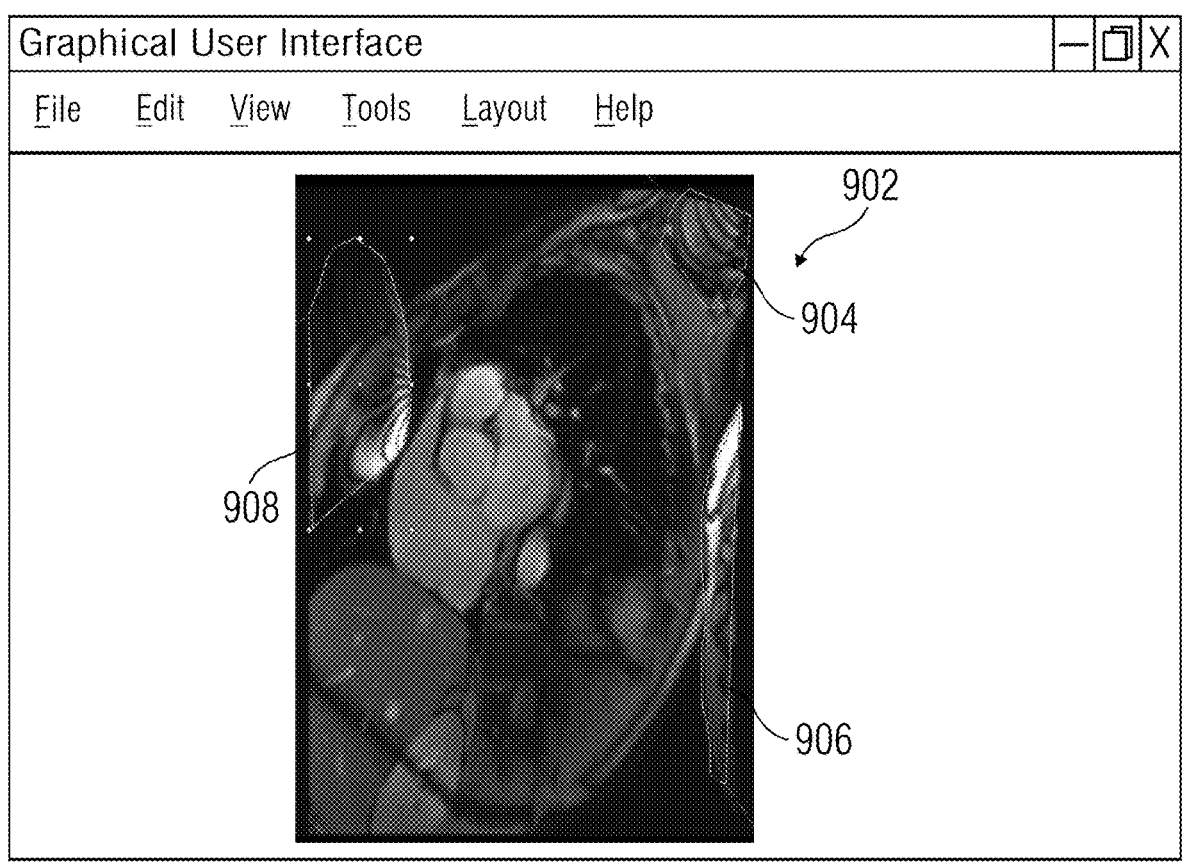
FIG. 9 is a graphical user interface depicted a medical image with localized artifacts, according to an embodiment.

FIG. 9 is a schematic representation of a graphical user interface 900 outputting the medical image with localized artifacts, according to an embodiment. There is shown a medical image 902. The medical image is classified and localized to identify one or more artifacts namely, a first artifact 904, a second artifact 906, and a third artifact 908. The artifact recognition module 114 classifies the received medical image 902 to identify one or more artifacts 904, 906, and 908. Further, the artificial intelligence algorithm computes at least one artifact of interest to be localized. Further, the artifact recognition module 114 localizes the artifacts of interest. Herein, the first artifact 904 is a zebra artifact, second artifact 906 is a zipper artifact, and the third artifact 908 is also a zebra artifact. The first artifact 904, the second artifact 906, and the third artifact 908 are highlighted and labelled in the medical image 902.

An advantage of the present disclosure is that the medical images provided to the physician for further analysis is highlighted with localized artifacts thereby providing that the artifacts and abnormalities are clearly distinguished. Another advantage is that the system determines which artifacts are artifacts of interest and then localizes specific artifacts of interest in the medical image, thereby providing selective localization of artifacts in the medical image. Another advantage is that localized artifacts in the medical images are highlighted, accurately labelled, and presented to the physician for further analysis, thereby providing accurate diagnosis of diseases in medical images of the patients in a time-efficient and accurate manner.

Those skilled in the art will recognize that, unless specifically indicated or required by the sequence of operations, certain acts in the processes described above may be omitted, performed concurrently or sequentially, or performed in a different order.

Those skilled in the art will recognize that, for simplicity and clarity, the full structure and operation of processing units suitable for use with the present disclosure is not being depicted or described herein. Instead, only so much of a processing unit as is unique to the present disclosure or necessary for an understanding of the present disclosure is depicted and described. The remainder of the construction and operation of the processing unit may conform to any of the various current implementation and practices known in the art.

It is to be understood that the device and methods described herein may be implemented in various forms of hardware, software, firmware, special purpose processors, or a combination thereof. One or more of the present embodiments may take a form of a computer program product including program modules accessible from computer-usable or computer-readable medium storing program code for use by or in connection with one or more computers, processors, or instruction execution system.

For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk, and optical disk such as compact disk read-only memory (CD-ROM), compact disk read/write, and digital versatile disc (DVD). Both processors and program code for implementing each aspect of the technology may be centralized or distributed (or a combination thereof) as known to those skilled in the art.

While the present disclosure has been described in detail with reference to certain embodiments, it should be appreciated that the present disclosure is not limited to those embodiments. The foregoing examples have been provided merely for the purpose of explanation and are in no way to be construed as limiting of the present disclosure disclosed herein. While the disclosure has been described with reference to various embodiments, it is understood that the words, which have been used herein, are words of description and illustration, rather than words of limitation. Further, although the disclosure has been described herein with reference to particular means, materials, and embodiments, the disclosure is not intended to be limited to the particulars disclosed herein; rather, the disclosure extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosure in its aspects.

The invention claimed is:

1. A method of generating a medical image with localized artifacts, the method comprising:
  receiving, by a processing unit, a medical image generated by an imaging modality;
  identifying a presence of one or more artifacts in the medical image using one or more trained machine learning models, wherein the one or more artifacts are one or more integral features in the medical image acquired from an anatomical region in a body of a patient, and wherein the identifying of the presence of the one or more artifacts in the medical image comprises:
    identifying the one or more artifacts in the medical image using the one or more trained machine learning models, wherein each artifact of the one or more artifacts correspond to a predefined class of artifacts; and determining a class associated with the one or more artifacts in the medical image using a predefined classification index;

determining at least one artifact of interest from the one or more artifacts based on a predefined criteria;

localizing the at least one artifact of interest in the medical image using a post processing technique; and outputting the medical image comprising the at least one localized artifact of interest on a graphical user interface, wherein the localizing of the at least one artifact of interest comprises:

determining data corresponding to a specific class of the at least one artifact of interest by back propagating the one or more trained machine learning models;

computing discriminative regions indicative of a location of the at least one artifact of interest in the medical image based on the determined data corresponding to the specific class of the at least one artifact of interest;

reconstructing an image comprising the discriminative regions indicative of the location of the at least one artifact of interest; and localizing the at least one artifact of interest in the medical image based on the reconstructed image.

2. The method of claim 1, wherein the identifying of the one or more artifacts in the medical image using the one or more trained machine learning models comprises:

inputting feature data to an input node of the trained machine learning model;

identifying at least one artifact belonging to a specific class of artifacts based on the feature data by the trained machine learning model; and outputting a class label indicating the at least one artifact belonging to the class of artifact in the medical image at an output node of the trained machine learning model.

3. The method of claim 2, wherein the determining of the class associated with the one or more identified artifacts in the medical image using the predefined classification index comprises determining a class associated with each artifact based on the class label outputted by the one or more trained machine learning models.

4. The method of claim 3, wherein the predefined classification index is a mapping between a position and a value of the class labels of the artifacts and the class of the artifacts.

5. The method of claim 3, wherein the predefined classification index is a mapping between the class of artifacts and a machine learning model identifier.

6. The method of claim 1, wherein the identifying of the one or more artifacts in the medical image using the one or more trained machine learning models comprises:

inputting feature data to an input node of the respective trained machine learning model of the one or more trained machine learning models, wherein each trained machine learning model of the one or more trained machine learning models is configured to detect an artifact in the medical image belonging to a specific class of artifacts;

identifying at least one artifact belonging to the specific class of artifacts in the medical image based on the feature data by each trained machine learning model of the one or more trained machine learning models; and outputting a class label indicating the presence of the at least one artifact belonging to the specific class of artifacts in the medical image at an output node of each trained machine learning model of the one or more trained machine learning models.

7. The method of claim 1, wherein the determining of the at least one artifact of interest from the one or more artifacts comprises determining the at least one artifact of interest in the medical image from the one or more artifacts using an artificial intelligence algorithm.

8. The method of claim 1, wherein the determining of the at least one artifact of interest from the one or more artifacts comprises determining the at least one artifact of interest in the medical image from the one or more artifacts using a predefined set of rules.

9. The method according to claim 1, wherein the localizing of the at least one artifact of interest in the medical image using the post processing technique comprises:

comparing the medical image with a plurality of pre-segmented medical images;

determining a region of interest in the medical image based on the comparing of the medical image with the plurality of pre-segmented medical images; and localizing the at least one artifact of interest in the medical image based on the determined region of interest.

10. The method of claim 1, wherein the predefined class of artifacts comprises a zebra strike artifact, a phase encoding artifact, a distorted artifact, a pulsation artifact, a susceptibility artifact, a zipper artifact, or a combination thereof.

11. The method of claim 1, wherein the one or more integral features comprise a lesion, fracture, tear, abrasion, cut, swelling, laceration, bruise, sore, contusion, or combination thereof.

12. A device for generating a medical image with localized artifacts, the device comprising:

a processing unit; and a memory unit communicatively coupled to the processing unit, wherein the memory unit comprises an artifact recognition module configured to:

receive a medical image generated by an imaging modality;

identify a presence of one or more artifacts in the medical image using one or more trained machine learning models, wherein the one or more artifacts are one or more integral features in the medical image acquired from an anatomical region in a body of a patient, and wherein the identifying of the presence of the one or more artifacts in the medical image comprises: (1) identifying the one or more artifacts in the medical image using the one or more trained machine learning models, wherein each artifact of the one or more artifacts correspond to a predefined class of artifacts; and (2) determining a class associated with the one or more artifacts in the medical image using a predefined classification index;

determine at least one artifact of interest from the one or more artifacts based on a predefined criteria;

localize the at least one artifact of interest in the medical image using a post processing technique; and output the medical image comprising the at least one localized artifact of interest on a graphical user interface, wherein the localizing of the at least one artifact of interest comprises:

determining data corresponding to a specific class of the at least one artifact of interest by back propagating the one or more trained machine learning models;

computing discriminative regions indicative of a location of the at least one artifact of interest in the medical image based on the determined data corresponding to the specific class of the at least one artifact of interest;

reconstructing an image comprising the discriminative regions indicative of the location of the at least one artifact of interest; and localizing the at least one artifact of interest in the medical image based on the reconstructed image.

13. The device of claim 12, wherein the one or more integral features comprise a lesion, fracture, tear, abrasion, cut, swelling, laceration, bruise, sore, contusion, or combination thereof.

14. A system comprising:

at least one imaging modality for acquiring a medical image of a patient; and a device communicatively coupled to the at least one imaging modality, the device comprising a processing unit and a memory unit communicatively coupled to the processing unit, wherein the memory unit comprises an artifact recognition module configured to:

receive a medical image generated by an imaging modality;

identify a presence of one or more artifacts in the medical image using one or more trained machine learning models, wherein the one or more artifacts are one or more integral features in the medical image acquired from an anatomical region in a body of the patient, and wherein the identifying of the presence of the one or more artifacts in the medical image comprises: (1) identifying the one or more artifacts in the medical image using the one or more trained machine learning models, wherein each artifact of the one or more artifacts correspond to a predefined class of artifacts; and (2) determining a class associated with the one or more artifacts in the medical image using a predefined classification index;

determine at least one artifact of interest from the one or more artifacts based on a predefined criteria;

localize the at least one artifact of interest in the medical image using a post processing technique; and output the medical image comprising the at least one localized artifact of interest on a graphical user interface, wherein the localizing of the at least one artifact of interest comprises:

determining data corresponding to a specific class of the at least one artifact of interest by back propagating the one or more trained machine learning models;

computing discriminative regions indicative of a location of the at least one artifact of interest in the medical image based on the determined data corresponding to the specific class of the at least one artifact of interest;

reconstructing an image comprising the discriminative regions indicative of the location of the at least one artifact of interest; and localizing the at least one artifact of interest in the medical image based on the reconstructed image.

15. The system of claim 14, wherein the one or more integral features comprise a lesion, fracture, tear, abrasion, cut, swelling, laceration, bruise, sore, contusion, or combination thereof.

16. A non-transitory computer readable storage medium comprising machine readable instructions, that when executed by a processing unit, cause the processing unit to:

receive a medical image generated by an imaging modality;

identify a presence of one or more artifacts in the medical image using one or more trained machine learning models, wherein the one or more artifacts are one or more integral features in the medical image acquired from an anatomical region in a body of a patient, and wherein the identifying of the presence of the one or more artifacts in the medical image comprises: (1) identifying the one or more artifacts in the medical image using the one or more trained machine learning models, wherein each artifact of the one or more artifacts correspond to a predefined class of artifacts; and (2) determining a class associated with the one or more artifacts in the medical image using a predefined classification index;

determine at least one artifact of interest from the one or more artifacts based on a predefined criteria;

localize the at least one artifact of interest in the medical image using a post processing technique; and output the medical image comprising the at least one localized artifact of interest on a graphical user interface, wherein the localizing of the at least one artifact of interest comprises:

determining data corresponding to a specific class of the at least one artifact of interest by back propagating the one or more trained machine learning models;

computing discriminative regions indicative of a location of the at least one artifact of interest in the medical image based on the determined data corresponding to the specific class of the at least one artifact of interest;

reconstructing an image comprising the discriminative regions indicative of the location of the at least one artifact of interest; and localizing the at least one artifact of interest in the medical image based on the reconstructed image.

17. The non-transitory computer readable storage medium of claim 16, wherein the one or more integral features comprise a lesion, fracture, tear, abrasion, cut, swelling, laceration, bruise, sore, contusion, or combination thereof.

* * * * *